US008825537B2

(12) United States Patent
Dick et al.

(10) Patent No.: US 8,825,537 B2
(45) Date of Patent: Sep. 2, 2014

(54) SYSTEM AND METHOD FOR FINANCIAL DATA MANAGEMENT AND REPORT GENERATION

(75) Inventors: Mischa Dick, Phoenix, AZ (US); Marjorie A. Green, Overland Park, KS (US); Gokhan Aydogan, Phoenix, AZ (US)

(73) Assignee: Six Sigma Systems, Inc., Phoenix, AZ (US)

( * ) Notice: Subject to any disclaimer, the term of this patent is extended or adjusted under 35 U.S.C. 154(b) by 38 days.

(21) Appl. No.: 12/039,642

(22) Filed: Feb. 28, 2008

(65) Prior Publication Data

US 2009/0222294 A1 Sep. 3, 2009

(51) Int. Cl.
*G06Q 40/00* (2012.01)
*G06Q 40/02* (2012.01)
*G06Q 10/06* (2012.01)

(52) U.S. Cl.
CPC .............. *G06Q 40/02* (2013.01); *G06Q 10/063* (2013.01)
USPC .............................................. 705/35; 705/32

(58) Field of Classification Search
USPC .......................................................... 705/35
See application file for complete search history.

(56) References Cited

U.S. PATENT DOCUMENTS

| | | | |
|---|---|---|---|
| 5,933,809 A | 8/1999 | Hunt et al. | |
| 7,117,172 B1* | 10/2006 | Black | 705/35 |
| 7,254,558 B2 | 8/2007 | Hinkle et al. | |
| 7,835,921 B1* | 11/2010 | Donnelly et al. | 705/2 |
| 2002/0065694 A1 | 5/2002 | Peters et al. | |
| 2003/0078881 A1 | 4/2003 | Elliott et al. | |
| 2003/0233278 A1 | 12/2003 | Marshall | |
| 2005/0171811 A1* | 8/2005 | Campbell et al. | 705/1 |
| 2007/0156557 A1 | 7/2007 | Shao et al. | |
| 2008/0133315 A1 | 6/2008 | Singh | |
| 2008/0306872 A1* | 12/2008 | Felsher | 705/51 |
| 2010/0257080 A1* | 10/2010 | Santalo et al. | 705/34 |

* cited by examiner

*Primary Examiner* — Eric T Wong
*Assistant Examiner* — John Anderson
(74) *Attorney, Agent, or Firm* — Sheppard, Mullin, Richter & Hampton LLP

(57) ABSTRACT

A system comprises at least one financial information management system storing financial data, the financial data including transaction data and account data for at least one account; a data aggregation system operative to retrieve data from the at least one financial information management system, to age the data relative to an aging date based on an account characteristic in addition to or instead of a transaction date, and to aggregate the aged data according to one or more predetermined rules; and a report generation system operative to generate reports from the aged and aggregated data.

20 Claims, 19 Drawing Sheets

Overall Scorecard

Summary Page 1 of 4 - Overall

Overall Scorecard

Insured Business Page 2 of 4 - Overall

Overall Scorecard

Insured Business Page 3 of 4 - Overall

Excludes SP and Medicare/Medicaid Outpatient transactions

Excludes SP and Medicare/Medicaid Outpatient transactions

Admitting Team Scorecard

Page 1 of 1

US 8,825,537 B2

SYSTEM AND METHOD FOR FINANCIAL DATA MANAGEMENT AND REPORT GENERATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to accounting systems and more particularly to a system and method for financial data management and report generation.

BACKGROUND

Financial success is often assessed in terms of accounting-based performance metrics, such as cash realization and time of service collection. These metrics are often imprecise, giving companies an inaccurate look at the financial strength of a team, department, organization, etc.

Cash realization is typically measured as a percentage of revenue. Many accounting departments compute cash realization by dividing the sum of cash receipts over the current month by the average monthly revenues of the preceding one or two months. This measurement is inherently imprecise. The numerator, i.e., the sum of cash receipts over the current month, includes cash associated with sales from the current month and all historic months. The denominator, i.e., the average monthly revenues over the preceding one or two months, only includes sales from the preceding one or two months. Thus, since the opportunity pool of the numerator and the opportunity pool of the denominator are mismatched, ergo the metric is imprecise. It should be noted that this metric is typically volatile and sometimes leads to cash realization in excess of 100%, a value that is logically not feasible.

Time of service collections is typically measured as a percentage of potential time of service collections. Many accounting departments compute time of service collections by dividing the actual time of service amounts received by the potential time of service collections. While the numerator (actual time of service collection amounts) can be determined accurately, the denominator (potential time of service collections) is often estimated based on total revenues. In businesses involving payments received from insurance carriers, the denominator is often further estimated by estimating a percentage of total revenue being direct customer liabilities. This leads to metric imprecision and volatility. Further, another significant source of error includes varying contract interpretations with the major payer, e.g., the insurance company. For example, in health care where claims are billed at gross revenue but reimbursed at net revenue, net revenue is subject to interpretation between the insurance company and the provider. Only after insurance liability has been settled can a true net revenue value be determined.

As a result of imprecision and volatility, management is often misinformed and cannot take corrective action to solve problems, leading to company performance deterioration. Further, financial success is often assessed by comparing teams, departments, organizations, etc. However, when accounting procedures differ, the same desired metric will likely not provide fair comparison.

Systems and methods that facilitate more precise accounting mechanisms and metrics are needed.

SUMMARY

In one embodiment, a system ages financial transactions and/or their associated accounts (e.g., encounters or charge sets) based on an account characteristic (e.g., date of discharge, shipment date, invoice date, etc.) and/or a transaction date. In one embodiment, financial data is aggregated at the account level based on aging criteria, including an aging date which may be determined from account characteristics. The aged account level data is then aggregated based on dates and/or groups relevant to one or more organizations. By aging financial transactions and/or accounts with respect to one or more characteristics of their associated accounts in addition to or instead of aging them based on a financial transaction date, and by aging them prior to aggregating the information for metrical purposes, the system isolates operational performance of an organization from the impact of its accounting decisions, thus providing more precise and less volatile metrics. Further, as financial data is normalized to this standard, comparisons become unbiased by intra-organizational accounting decisions.

In another embodiment, the present invention provides a system comprising at least one financial information management system storing financial data, the financial data including transaction data and account data for at least one account; a data aggregation system operative to retrieve data from the at least one financial information management system, to age the data relative to an aging date based on an account characteristic and/or a transaction date, and to aggregate the aged data according to one or more predetermined rules; and a report generation system operative to generate reports from the aged and aggregated data.

For the system, at least one financial information management system may store financial data for at least one organization. The data aggregation system may include an aggregation module operative to control the times to retrieve transaction data from the at least one financial information management system. The data aggregation system may include a data normalization module operative to normalize transaction data to a common standard. The aging date may include one of date of discharge, date of final bill, or transaction date. The predetermined rules may include a first function based on transaction type and age. The transaction type may include one of payment type, adjustment type, refund type or denial type. The data aggregation module may store respective portions of the aged and aggregated data belonging to particular combinations of transaction type, account characteristics, and age in a first set of buckets. The predetermined rules may include a second function based on group, and the data aggregation module generates aged, aggregated and grouped data. The data aggregation module may store respective portions of the aged, aggregated and grouped data belonging to particular combinations of transaction type, age and group in a second set of buckets. The predetermined rules may include a third function based on a group set, and the data aggregation module is operative to store particular combinations of aged, aggregated and grouped transaction data for the group set in a third bucket.

In one embodiment, the present invention provides a method comprising retrieving financial data, the financial data including transaction data and account data for at least one account, from at least one financial information management system; aging the data relative to an aging date based on an account characteristic and/or a financial transaction date; aggregating the aged data according to one or more predetermined rules; and generating reports from the aged and aggregated data.

For the method, the at least one financial information management system may store financial data for at least one organization. The retrieving the financial data from the at least one financial information management system may occur according to a predetermined schedule. The method may further comprise normalizing the financial data to a common standard. The aging date may include one of date of discharge, date of final bill, or transaction date. The predetermined rules may include a first function based on transaction type and age. The transaction type may include one of payment type, adjustment type, refund type or denial type. The method may further comprise storing respective portions of the aged and aggregated data belonging to particular combinations of transaction type and age in a first set of buckets. The predetermined rules may include a second function based on group, and the method may further comprise generating aged, aggregated and grouped data. The method may further comprise storing respective portions of the aged, aggregated and grouped data belonging to particular combinations of transaction type, account characteristics, age and group in a second set of buckets. The predetermined rules may include a third function based on a group set, and the method may further comprise storing particular combinations of aged, aggregated and grouped data for the group set in a third bucket.

BRIEF DESCRIPTION OF THE DRAWINGS

FIGS. 5-1 to 5-4 includes graphs of a financial report of an overall organization, in accordance with an embodiment of the present invention.

DETAILED DESCRIPTION

The following description is provided to enable any person skilled in the art to make and use the invention. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

In one embodiment, a system ages financial transactions and/or their associated accounts (e.g., encounters or charge sets) based on an account characteristic (e.g., date of discharge, shipment date, invoice date, etc.). In one embodiment, financial transactions are aggregated at the account level based on aging criteria, including an aging date which may be determined from account characteristics. The aged account level data is then aggregated based on dates and/or groups relevant to one or more organizations. By aging financial transactions and/or accounts with respect to one or more characteristics of their associated accounts prior to aggregating the information for metrical purposes, the system isolates operational performance of an organization from the impact of its accounting decisions, thus providing more precise and less volatile metrics. Further, as financial data is normalized to this standard, comparisons become unbiased by intra-organizational accounting decisions.

Figure 1:
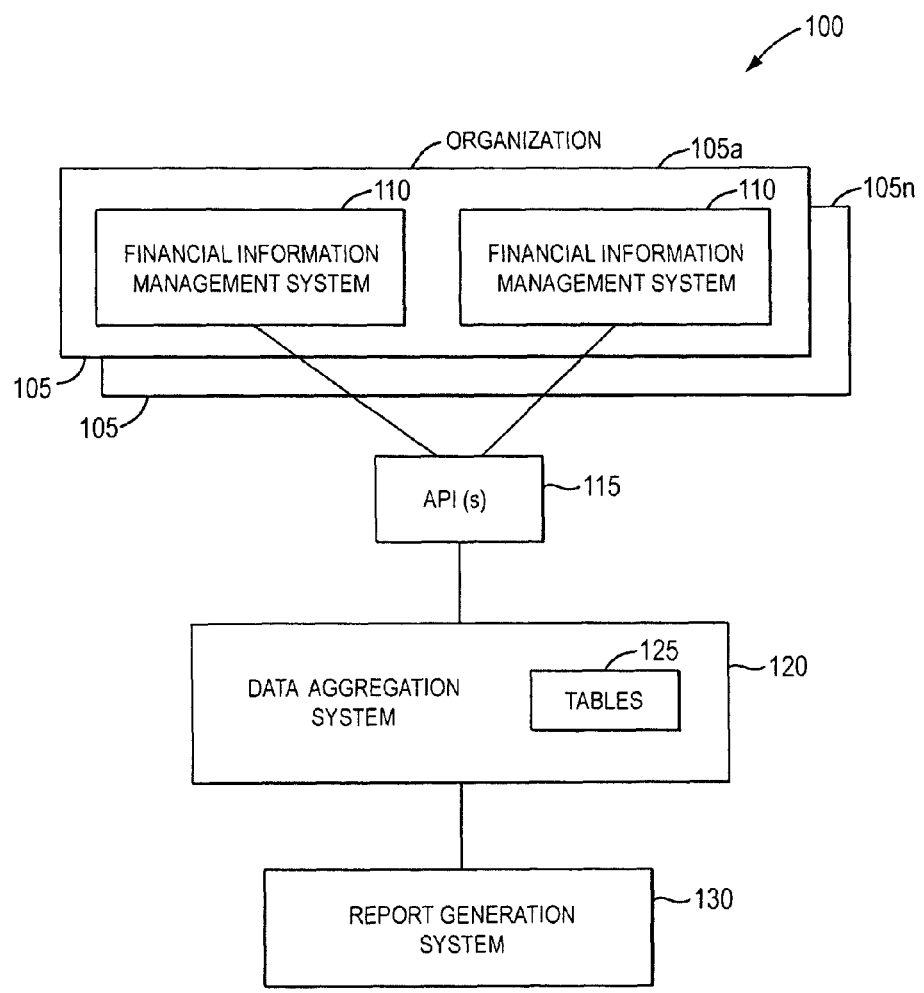
FIG. 1 is a block diagram of a financial data management network, in accordance with an embodiment of the present invention.

FIG. 1 is a block diagram of a financial data management network 100, in accordance with an embodiment of the present invention. The financial data management network 100 includes one or more organizations 105a . . . 105n, one or more application program interfaces (APIs) 115 coupled to the one or more organizations 105a . . . 105n, a data aggregation system 120 coupled to the one or more APIs 115, and a report generation system 130 coupled to the data aggregation system 120. The components of the financial data management network 100 may be on a single site or distributed among multiple sites.

Each organization 105 includes one or more financial information management systems 110, such as Meditech, HBOC McKesson, IDX, SAP, etc. Each financial information management system 110 includes a database of financial data including entity data (e.g., patient account data, customer account data, corporate account data, etc.), service data (e.g., services provided, sales made, dates occurred, charges involved, etc.), service provider notes (e.g., doctor notes, nurse notes, salesman notes, etc.), invoice data (e.g., invoice amounts, dates mailed, etc.), payment data (e.g., monies received at time of service, insurance fees received, dates received, etc.), refund data (e.g., monies refunded to a customer, etc.), adjustments data (e.g., modifications to the charges, etc.), insurance data, denial data (e.g., denial of insurance data, bounced check data, etc.), entity group data (e.g., data on the structure of the organization, etc.), collection agency data (e.g., identification of collection agencies and accounts transferred to them, etc.), etc. A financial information management system 110 may contain the financial data for the entire organization 105, for a predetermined subgroup (e.g., single region, single facility, single department, single team, etc.) within the organization 105, for portions of one or more groups, etc. It is understood that different financial information management systems 110 may store different financial data.

Each API 115 includes hardware, software and/or firmware for enabling communication with one or more financial information management systems 110. Each API 115 may be customized/configured for a particular financial information management system 110, or for a particular protocol and/or format. For example, if a single organization 105 uses different financial information management systems 110, each implementing a different system protocol and/or format, multiple APIs 115 may be needed to communicate with the different financial information management systems 110 of the single organization 105.

The data aggregation system 120 includes hardware, software and/or firmware for gathering the financial data via the API(s) 115 from the financial information management systems 110, and for generating usable data structures according to a predetermined standard. In one embodiment, the data aggregation system 120 stores the financial data received from the API(s) 115 in a Microsoft SQL Server database or data warehouse. If financial data is missing from a financial information management system 110, other sources may be used.

The data aggregation system 120 may use a data transformation package, such as SQL Server 2005 Integration Services, to normalize the financial data from the different financial information systems 110 to a predetermined standard and to load the normalized financial data into SQL Server database tables 125. In one embodiment, the SQL Server database tables 125 includes a transaction table 125 (which contains a record for each transaction) and an account table 125 (which contains a record for each account, e.g., encounter or charge set).

From the transaction data in the transaction table 125 and account data in the account table 125, the data aggregation system 120 generates age-based aggregation tables 125 including (1) an "aging table" which contains financial transactions and/or accounts aggregated by age (e.g., by time period such as week, month, year, etc.) and transaction type (e.g., charge, payment, refund, adjustment, denial, etc.), (2) "time and group tables" which contain age-based transactions and/or accounts further aggregated by group (e.g., organization, facility, department, team, etc.), and (3) "comparative groupings tables" which contain comparisons of the time and group aggregations (e.g., across groups for a predetermined time period).

By aggregating financial data based on transaction and/or account age, transaction type, group, etc., more precise and less volatile metrics are possible.

The report generation system 130 includes hardware, software and/or firmware for generating reports from the tables 125 generated by the data aggregation system 120. In one embodiment, because the data aggregation system 120 previously generated the aggregation tables 125, the report generation system 130 can generate reports on the fly, quickly, and easily. In another embodiment, the report generation system 130 can instruct the data aggregation system 120 to generate one or more aggregation tables 125 at the time of a report request.

Figure 2:
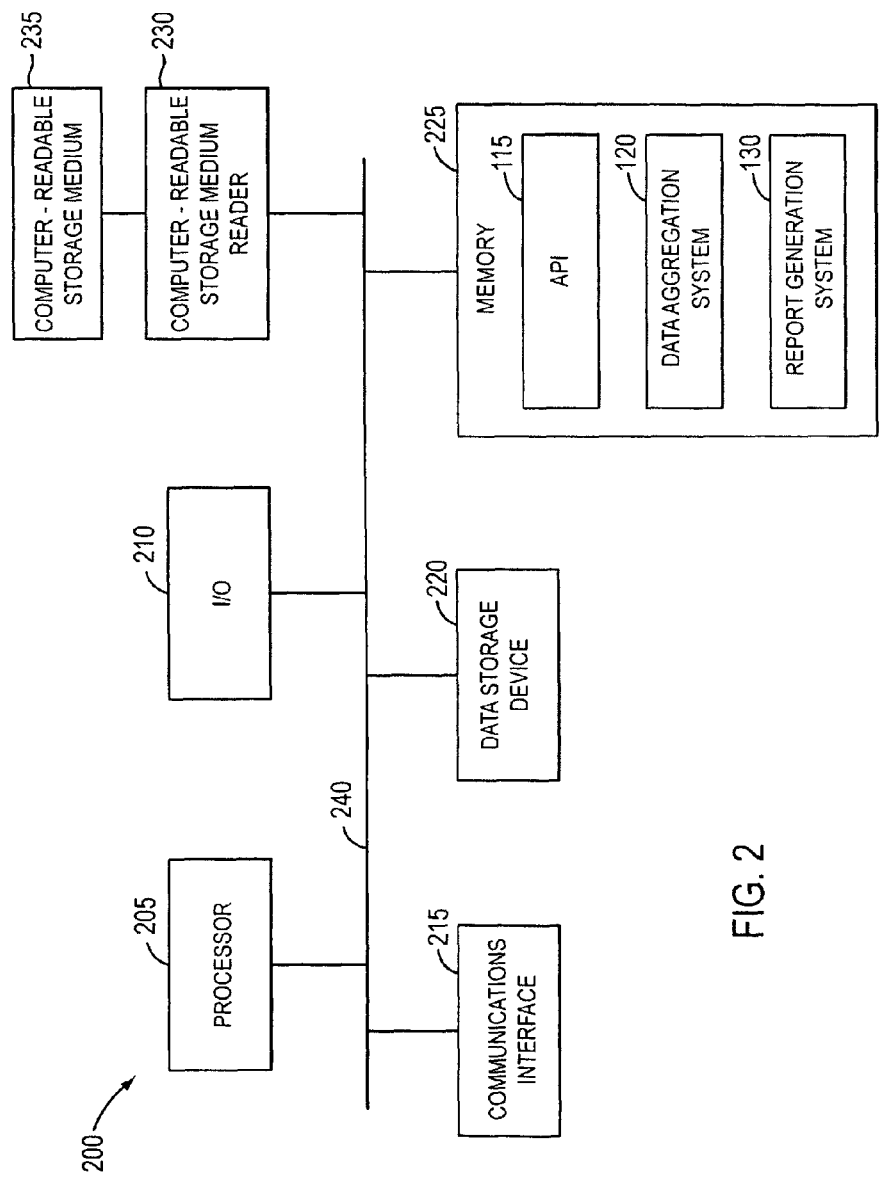
FIG. 2 is a block diagram illustrating details of a computer system operative to provide financial data management and report generation, in accordance with an embodiment of the present invention.

FIG. 2 is a block diagram illustrating details of a computer system 200 operative to provide financial data management and report generation, in accordance with an embodiment of the present invention. Computer system 200 includes a processor 205, such as an Intel Pentium® microprocessor or a Motorola Power PC® microprocessor, coupled to a communications channel 240. The computer system 200 further includes an input/output devices 210 such as a keyboard, mouse and a flat panel display. The computer system 200 further includes a communications interface 215, a data storage device 220 such as a magnetic disk, and memory 225 such as random-access memory (RAM), each coupled to the communications channel 240. The communications interface 215 may be coupled to a network such as the wide-area network commonly referred to as the Internet. One skilled in the art will recognize that, although the data storage device 220 and memory 225 are illustrated as different units, the data storage device 220 and memory 225 can be parts of the same unit, distributed units, virtual memory, etc. Further, it will be appreciated that the term "memory" herein is intended to cover all data storage media whether permanent or temporary.

The data storage device 220 and/or memory 225 store the API(s) 115, the data aggregation system 120, and the report generation system 130. The data storage device 220 and/or memory 225 may also store an operating system (not shown) such as the Microsoft Windows XP, Linux, the IBM OS/2 operating system, the MAC OS, and/or UNIX operating system. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 200 may also include additional components, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 230 such as a magnetic disk drive, hard disk drive, magneto-optical reader, CPU, etc. may be coupled to the communications channel 240 for reading a computer-readable storage medium (CRSM) 235 such as a magnetic disk, a hard disk, a magneto-optical disk, RAM, etc. Accordingly, the computer system 200 may receive programs and/or data via the CRSM reader 230.

Figure 3:
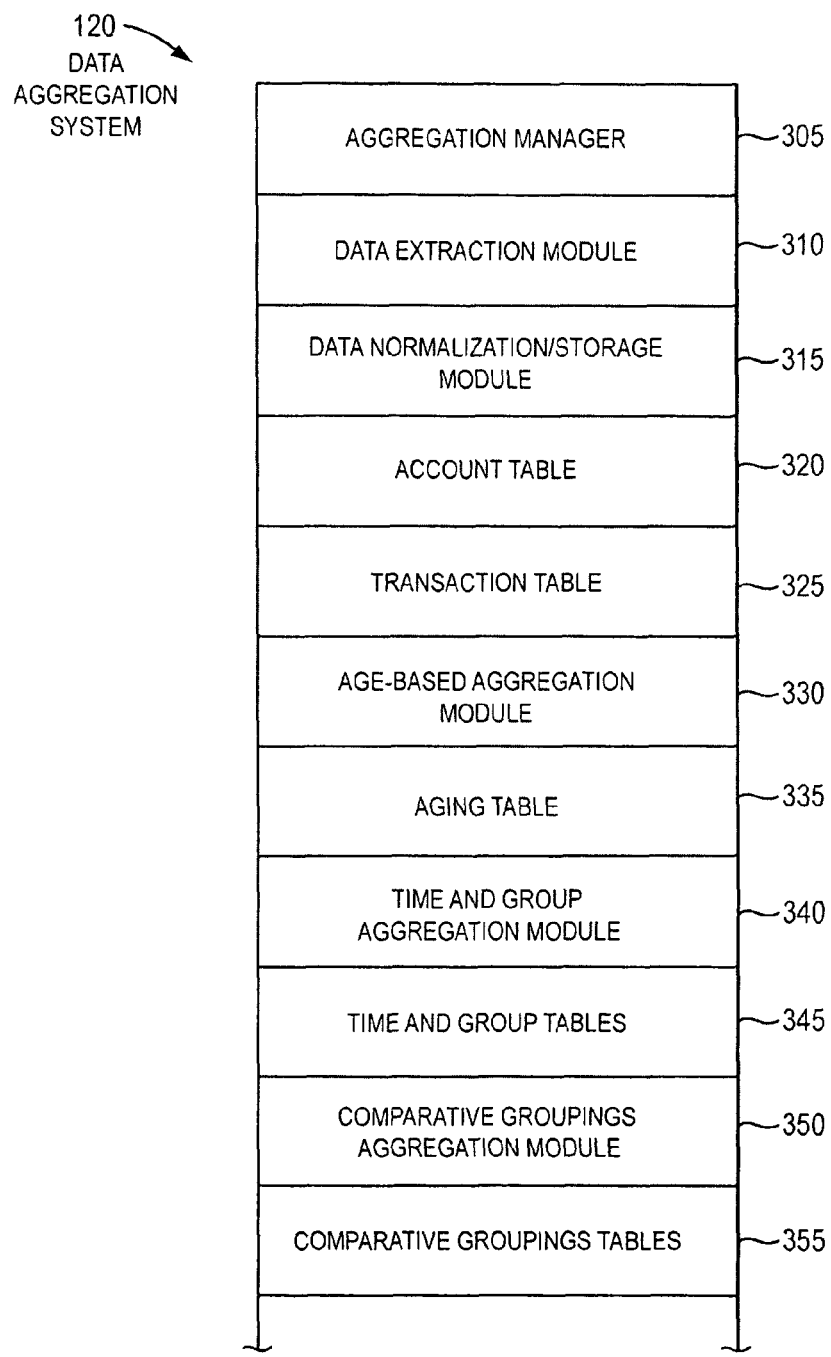
FIG. 3 is a block diagram illustrating details of the data aggregation system of FIGS. 1 and 2, in accordance with an embodiment of the present invention.

FIG. 3 is a block diagram illustrating details of the data aggregation system 120, in accordance with an embodiment of the present invention. Data aggregation system 120 includes an aggregation manager 305, a data extraction module 310, a data normalization/storage module 315, an account table 320, a transaction table 325, an age-based aggregation module 330, an aging table 335, a time and group aggregation module 340, time and group tables 345, a comparative groupings aggregation module 350, and comparative groupings tables 355.

The aggregation manager 305 cooperates with the data extraction module 310 to control data retrieval from the financial information management system(s) 110. The aggregation manager 305 may retrieve financial data on a periodic basis (monthly, weekly, daily, etc.), upon request, at predetermined times (e.g., at 5 pm on weekdays), after predetermined events (e.g., after 10 new entries are input into the financial information management system 110), and/or other schedule. The aggregation manager 305 may instruct the data extraction module 310 to retrieve data from different financial information management systems 110 at different times.

The aggregation manager 305 cooperates with the other components to control generation and regeneration of the aggregation tables 125. The aggregation manager 305 may generate the aggregation tables 125 on a periodic basis, upon request, at predetermined times, after predetermined events, and/or per other schedule. The aggregation manager 305 may control aggregation table generation and regeneration according to a different schedule than the schedule of financial data retrieval from the financial information management system(s) 110. The aggregation manager 305 may control aggregation table generation and regeneration upon receiving financial data from one or more of the financial information management systems 110, and need not wait until all new financial data has been retrieved from each and every financial information management system 110. It will be appreciated that the aggregation table generation and/or regeneration may occur on a regular basis so that report generation can be done without requiring concurrent aggregation table generation and/or regeneration.

The data extraction module 310, upon instruction from the aggregation manager 305, communicates with the API(s) 115 to retrieve financial data from the financial information management system 110. The data extraction module 310 forwards the data to the data normalization module 315.

The data normalization/storage module 315 converts financial data received from the data extraction module 310 to a predetermined standard/format, e.g., to a specific calendar, clock, currency, terminology, etc. The data normalization/storage module 315 then stores the normalized financial data in the account table 320 and transaction table 325.

The account table 320 includes account records, each record including account data for a particular encounter (which may include information about a set of charges for a particular event). For example, account data may include customer name, contact data, customer type, insurance data, contractual information, discharge date, order date(s), invoice date, shipping date(s), etc.) for an entity. In one embodiment, all charges incurred are tied to a single account (e.g., encounter).

The transaction table 325 includes transaction records, each record identifying a particular transaction (e.g., payment, adjustment, refund, or denial) and its type (e.g., payment type, adjustment type, refund type or denial type).

Figure 10:
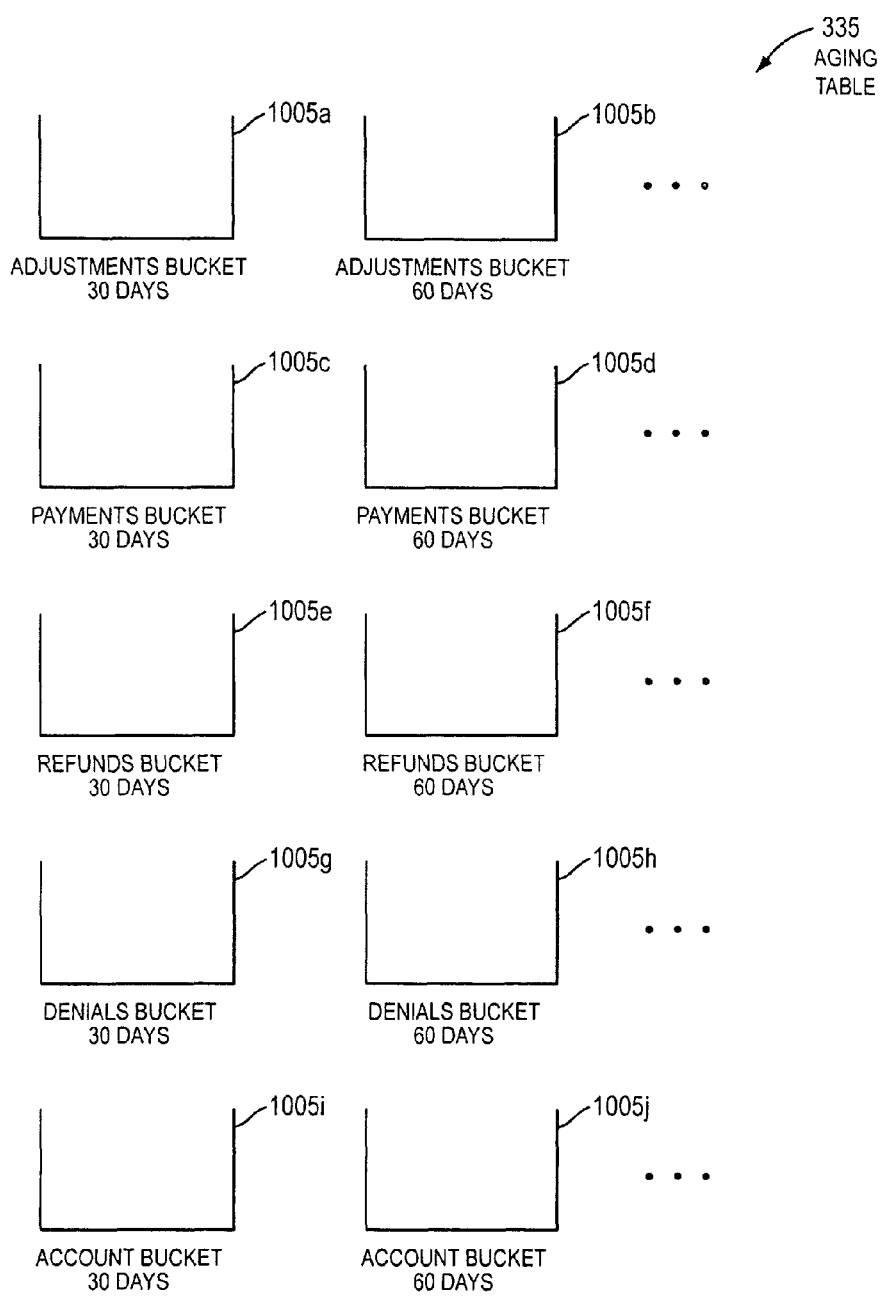
FIG. 10 illustrates an ex ample aging table, in accordance with an embodiment of the present invention.

The age-based aggregation module 330 aggregates the transactions and/or accounts and stores the age-based financial data in the aging table 335. An example aging table is shown in FIG. 10. In one embodiment, the age-based aggregation module 330 aggregates transactions based on transaction type and on age relative to an aging date. Example aging dates for aging an account and/or a transaction include invoice date, transaction date, patient discharge date, date of final bill, sale date, shipment date, customer receipt date, raw material purchase date, etc. The age-based aggregation module 330 may be configured to age transaction records based on one or more aging dates that represent the time when account receivables begin to age. In one embodiment, the age-based aggregation module 330 separately ages transactions for an account based on one or more single dates, e.g., patient discharge date, transaction date, and date of final bill. Aging transactions separately by different dates provides different types of aging information, each type useful as measures of financial progress.

In one embodiment, the age-based aggregation module 330 places the accounts and transaction records into aging buckets. Accounts may be placed into aging buckets in one manner; transactions in a second manner. Age-based aggregation module 330 may place accounts into aging buckets relative to the present date. For example, if the difference between the present date and the aging date is greater than 29 days and less than 60 days, age-based aggregation module 330 may add the account to a bucket designated for 30-day old accounts. Age-based aggregation module 330 may place transactions into aging buckets relative to their transaction date. Aging buckets for transactions may further correspond to transaction type. For example, if the difference between the transaction date and the aging date is less than 31 days for an adjustment transaction, then the age-based aggregation module 330 may add the adjustment transaction record to a bucket designated for adjustments at day 30. If the difference between the transaction date and the aging date is greater than 30 days and less than 61 days for an adjustment transaction, then the age-based aggregation module 330 may add the adjustment transaction record to a bucket designated for adjustments at day 60, and so on. The age-based aggregation module 330 applies similar techniques for each transaction type (e.g., payments, refunds, denials, etc.) and examined age. In one embodiment, the age-based aggregation module 330 adds transaction records to buckets by transaction type at days 30, 60, 90, 120, 150, 180, 210, 240, 270, 300, 330, 360, 390, 420, 450 and 480, relative to the aging date.

In one embodiment, the age-based aggregation module 330 places transaction records into aging buckets based on transaction type and date ranges (as opposed to age). For example, the age-based aggregation module 330 may place all adjustment transactions that occur between 30 and 90 days of an aging date into a bucket for adjustment transactions for that determined aging time period.

In one embodiment, the age-based aggregation module 330 places transaction records into buckets based on additional criteria other than or in addition to age and/or transaction type. For example, the age-based aggregation module 330 may place adjustment transactions that are not deemed write-offs to charity into a bucket. Or, the age-based aggregation module 330 may place payment transactions that are personal payments (e.g., payments not made by an insurance carrier or government agency such as Medicare) into a bucket. Or, the age-based aggregation module 330 ages transactions according to account state. For instance, the age-based aggregation module 330 may age transactions and/or accounts relative to the aging date if the account status indicates that a final bill has been created for the account or if the account status indicates that the associated account has been discharged.

Although the embodiments above have been described as generating a bucket for a single transaction type, the age-based aggregation module 330 may generate a bucket that combines transaction types, e.g., by placing the net amount owed (i.e., subtracting the sum of all payments and adjustments from total charges) into a bucket.

It will be appreciated that financial information has different relevance and importance across industries. Accordingly, the specifics of the age-based aggregation module 330 may depend on the industry. For instance, in healthcare, revenue is often reduced under contract with payers, such as insurance companies. Since full revenue will not be collected under an insurance contract, such factors may be taken into account. For example, when calculating net amount owed in the healthcare industry, the age-based aggregation module 330 may apply a factor that reflects the contractual reduction in revenue.

Figure 11:
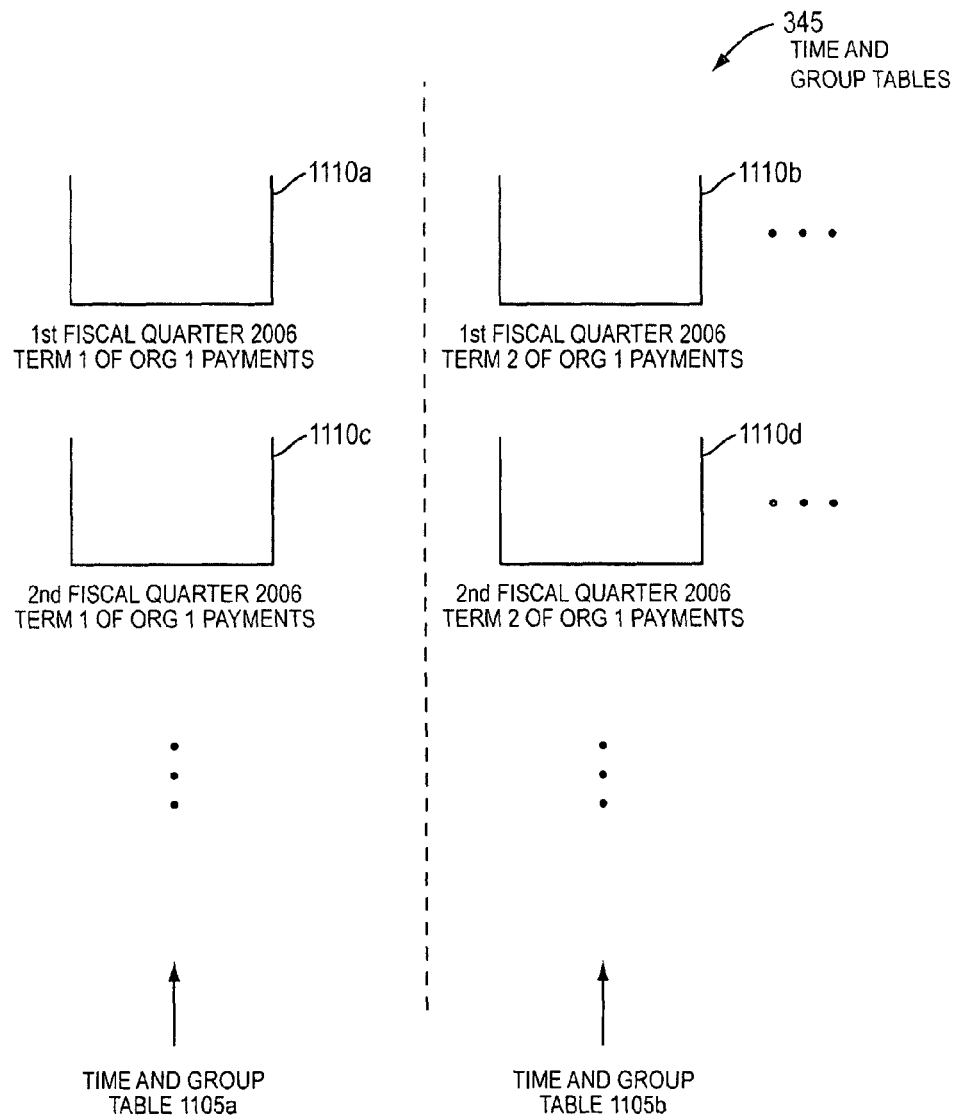
FIG. 11 illustrates example time and group tables, in accordance with an embodiment of the present invention.

The time and group aggregation module 340 further aggregates the aged data stored in the aging table 335 by time period (e.g., January 2006, First Quarter 2006, Year 2006, etc.) and/or group (e.g., overall organization, individual regions, individual facilities, individual departments, individual teams, etc.), and stores the grouped data in time and group tables 345. Example time and group tables 345 are shown in FIG. 11. In one embodiment, the time and group aggregation module 340 generates a different time and group table 345 for each distinct group. The time and group aggregation module 340 generates different records within a time and group table 345 for each time period. For example, the time and group aggregation module 340 may create an organizational level time and group table 345 to contain the grouped data for a first organization. The time and group aggregation module 340 may create one record for a particular age period that aggregates the aged data that pertains to the first organization for the particular age period. As another example, the time and group aggregation module 340 may create a department level time and group table 345 to contain the grouped data for one or more departments. The time and group aggregation module 340 may create one record that aggregates the aged data that pertain to a particular department for a particular age period. In one embodiment, the time and group aggregation module 340 creates a set of time and group tables 345 to aggregate the aged data of all groups relevant to an organization 105 for each organization 105.

Figure 12:
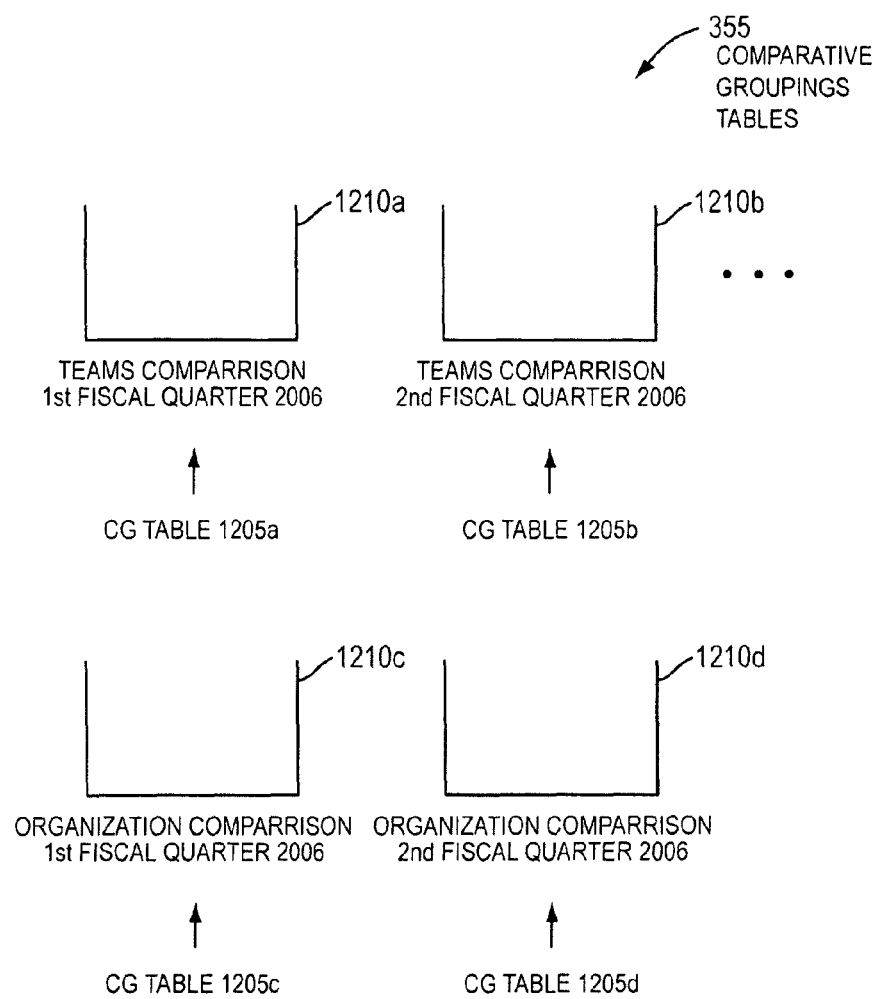
FIG. 12 illustrates example comparative groupings tables, in accordance with an embodiment of the present invention.

The comparative groupings aggregation module 350 further aggregates the aged data to generate comparative groupings data, and stores the comparative groupings data in comparative groupings tables 355. Example comparative groupings tables 355 are shown in FIG. 12. Instead of generating grouped data that is configured to reflect financial data for a group over time, the comparative groupings aggregation module 350 generates comparative groupings data configured to reflect data comparisons across multiple groups, whether for a single time period or across time. As stated above, groups may include organizations, regions, facilities, departments, teams, etc., depending upon what comparisons are desired.

In one embodiment, the comparative groupings aggregation module 350 generates a distinct comparative groupings table 345 for each group set identified for comparison (e.g., all teams of a first organization) and time period. The comparative groupings aggregation module 350 generates records for each group of the group set. For example, the comparative groupings aggregation module 350 may aggregate time and group data at the organization level for one or more time periods (e.g., January 2006) for each organization, and store each aggregation for a corresponding organization as a record in an organizational comparison table 355 for the time periods. In one embodiment, the comparative groupings aggregation module 350 may complete this comparison based on the last monthly data point available.

Figure 4:
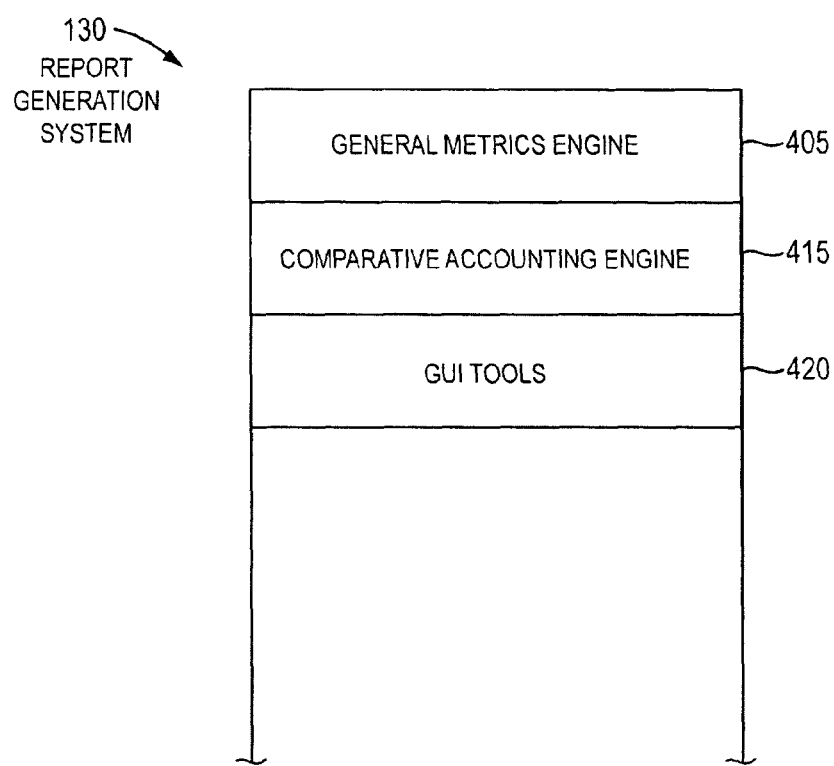
FIG. 4 is a block diagram illustrating details of the report generation engine of FIGS. 1 and 2, in accordance with an embodiment of the present invention.

FIG. 4 is a block diagram illustrating details of the report generation system 130, in accordance with an embodiment of the present invention. The report generation system 130 includes a general metrics engine 405, a comparative accounting engine 415, and GUI tools 420.

The general metrics engine 405 generates a number of reports from the aging table 335 and/or time and group tables 345, including a cash realization report, a time of service report, and/or other metric reports. Whereas cash realization is generally a measure of cash as a percent of the net revenues owed, the general metrics engine 405 generates cash realization metrics by defining payments made at day 120 divided by the net owed at day 120. In one embodiment, in support of this metric, the age-based aggregation module 330 calculated both payments made by day 120 and net owed at day 120, and stored them in the aging table 335. The time and group aggregation module 340 further aggregated the aged data by time and/or group, and stored them in the time and group tables 345. Thus, to calculate net-to-cash 120/120 for the overall organization for a particular month, the general metrics engine 405 need only retrieve a record from a time and group table 345 for the overall organization for the particular time period to obtain both the payments made by day 120 and the net owed at day 120. Then, the general metrics engine 405 need only divide the payments made by day 120 by the net owed at day 120 for each time period and report it. In this manner, the cash realization metrics are calculated with precision that isolates operating performance from the influences of accounting decisions. Characteristics of the account that affect revenue collection (in this metric the patient discharge date) are employed to age the data, so that metrics calculated from the aged data are more precise to the measurement of revenue collection.

In one embodiment, the general metrics engine 405 is configured to generate time of service reports from the aging table 335 and/or the time and group tables 345. Instead of measuring time of service payment as the actual time of service amounts received divided by an estimation of the potential time of service collections, the general metrics engine 405 calculates time of service as a percent of potential time of service collections. By applying account characteristics (in this metric, the existence of contractualized agreements in place with insurance carriers at the time of service) in aging the data related to known net revenues, liability allocations and payments made at the time of service, the general metrics engine 405 calculates the time of service metric with absolute precision. While this metric is sample-based in that net revenues and liability allocations will never be known for the entire population of accounts, they will be known with precision for sample accounts. Since account volumes are typically on the order of thousands of accounts, sampling error is orders of magnitude lower than the estimation error of the traditional metric.

The comparative accounting engine 415, possibly in conjunction with general metrics engine 405, generates comparative reports from the comparative groupings tables 355. In one embodiment, the comparative accounting engine 415 is capable of determining the performance (ranking and/or percentile) of a specific group relative to other groups. For monthly (or other time period) metrics, the comparative accounting engine 415 may generate this comparison based on one or more data points, including for example, the last monthly (or other time period) data point available.

In one embodiment, the general metrics engine 405 and/or comparative accounting engine 415 generate interactive electronic reports that include data points generated by general metrics engine 405 plotted on a bar graph, with groups along the horizontal axis and the calculated value of a metric along the vertical axis. Or, the general metrics engine 405 and/or comparative accounting engine 415 may generate a report that includes data points generated by general metrics engine 405 plotted on a bar graph, with time along the horizontal axis and the multiple calculated values per time period plotted for each group along the vertical axis. The general metrics engine 405 and/or comparative accounting engine 415 may enable interaction with the data points generated by general metrics engine 405 on the comparative charts, such that clicking on one of the data points generates additional reports that reflect details about the organization, groups and/or accounts included in the data point. For instance, clicking on a data point that represents organization-wide net-to-cash 120/120 may cause general metrics engine 405 and/or comparative accounting engine 415 to generate an electronic report that includes data points representing net-to-cash 120/120 for each region in the organization. General metrics engine 405 and/or comparative accounting engine 415 may further enable interaction with each of the regional data points to generate additional reports that reflect detail about the regions.

To compare organizations, the comparative accounting engine 415 may secure data point interactivity, so as not to generate additional reports or reveal a details where inappropriate. In this manner, metrics generated by general metrics engine 405 will be accessible by multiple customer organizations, with each respective organization having access only to appropriate data. In comparing groups within an organization, general metrics engine 405 and/or comparative accounting engine 415 may secure data points interactivity, so that the detail associated with the generated metrics may be revealed only to selective groups within the organization.

The GUI tools 420 enable various output formats. The GUI tools 420 may enable output to be presented using formats such as lists, spreadsheets, graphs, control charts and/or interactive electronic display (e.g., using Microsoft SQL Server Reporting Services). In the case of interactive electronic display, the GUI tools 420 may secure data point interactivity, so as not to reveal details where inappropriate. Given appropriate security, interactive "drill downs" from the metrics may allow users to audit the groups and/or accounts that had the most impact on performance.

Figures 1A, 5:
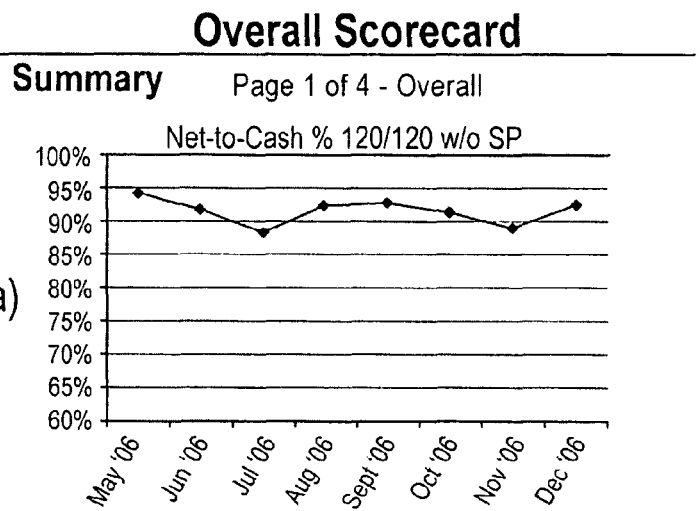
Figures 1B, 5:
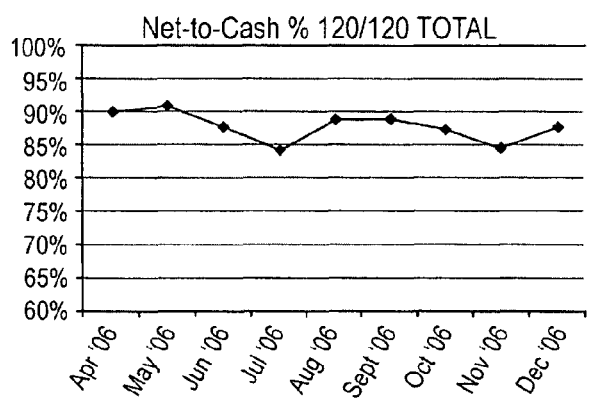
Figures 1C, 5:
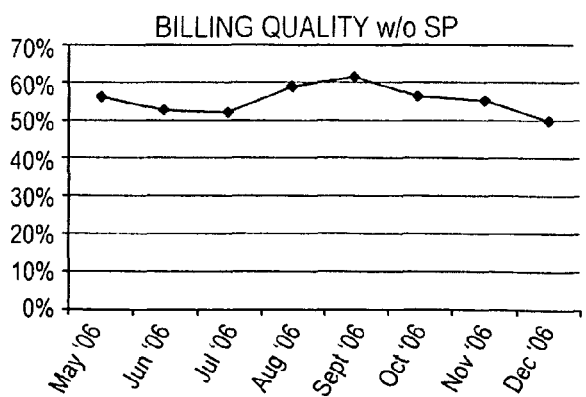
Figures 1D, 5:
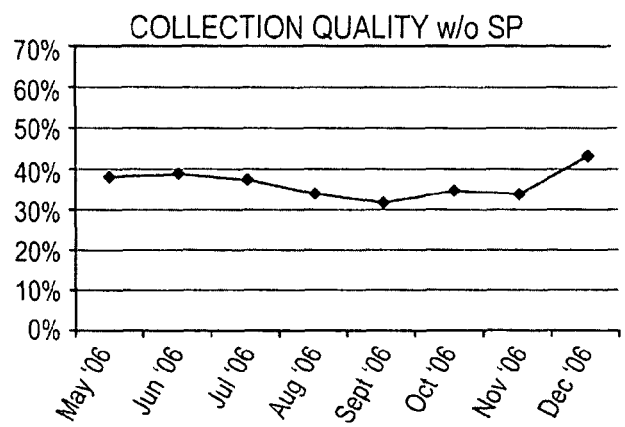
Figures 1E, 5:
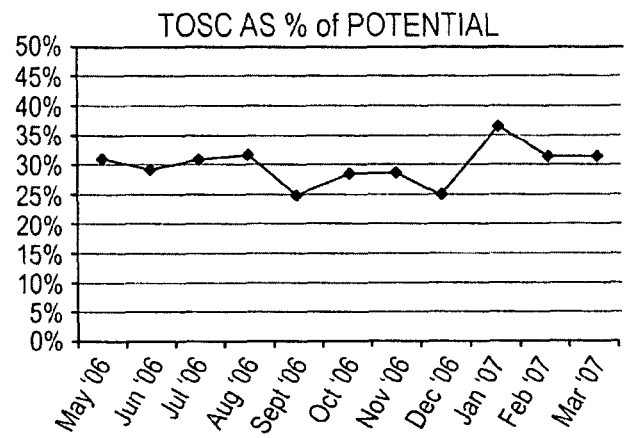
Figures 1F, 5:
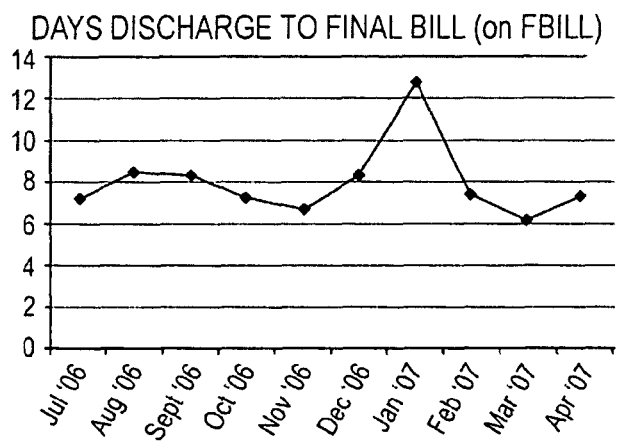

FIG. 5-1 includes a number of reports generated by general metrics engine 405 and GUI tools 420 for an overall organization based on data stored in the aging table 335, and time and group table 345, in accordance with an embodiment of the present invention. FIG. 5-1(a) is a chart that shows how GUI tools 420 represent the cash realization metric calculated by general metrics engine 405 and described in detail, above. Data points created by general metrics engine 405 for this metric are represented graphically by GUI tools 420 over the period from May 2006 to December 2006. FIG. 5-1(b) is a chart of payments received for all account by day 120 divided by amounts owed at day 120 over the same time period. FIG. 5-1(c) is a chart of payments received for accounts with insurance by day 30 divided by the amount owed at day 120 over the same time period, thus representing the speed a bill is sent to an insurance company. FIG. 5-1(d) is a chart of payments received for accounts with insurance between days 30-120 divided by the amount owed at day 120 over the same period. FIG. 5-1(e) is a chart of time of service collections divided by potential revenue to be collected over the period from May 2006 to March 2007. FIG. 5-1(f) is a chart of days after patient discharge until the final bill is mailed over the period from June 2006 to April 2007.

Figures 2A, 5:
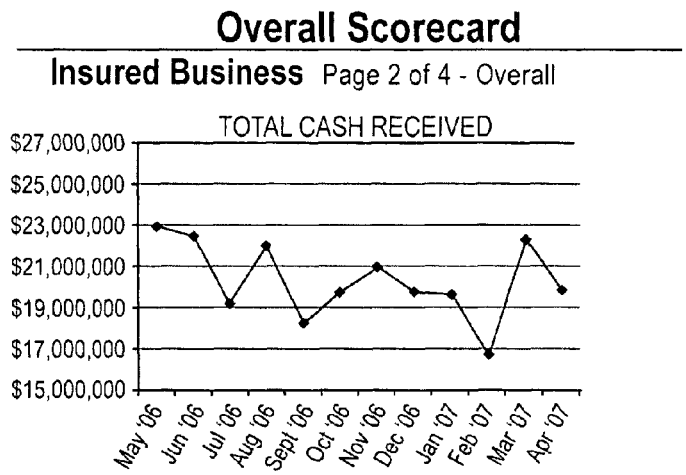
Figures 2B, 5:
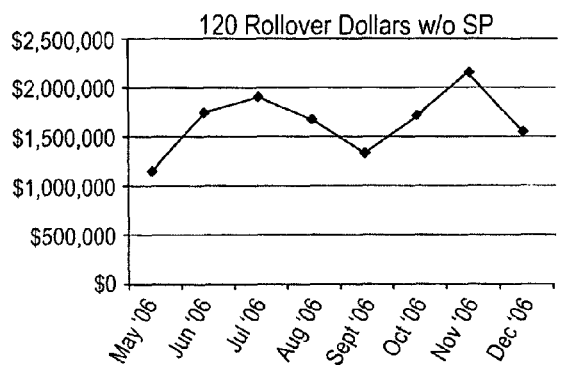
Figures 2C, 5:
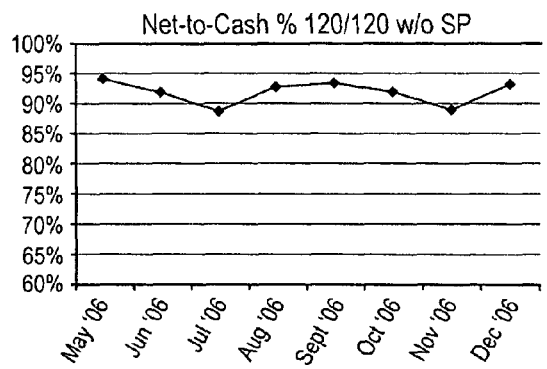
Figures 2D, 5:
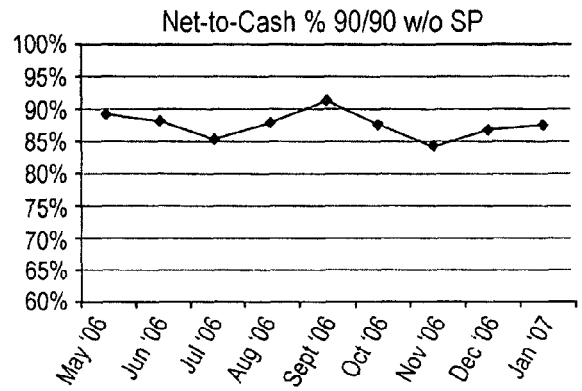
Figures 2E, 5:
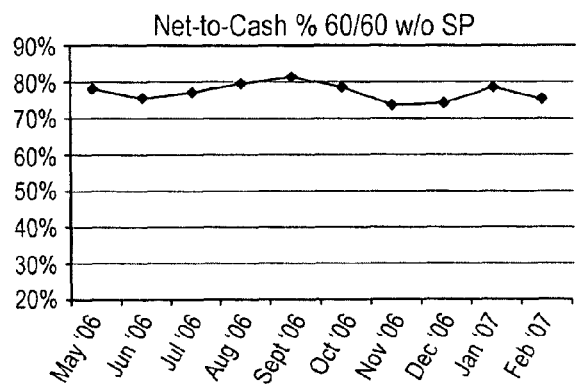
Figures 2F, 5:
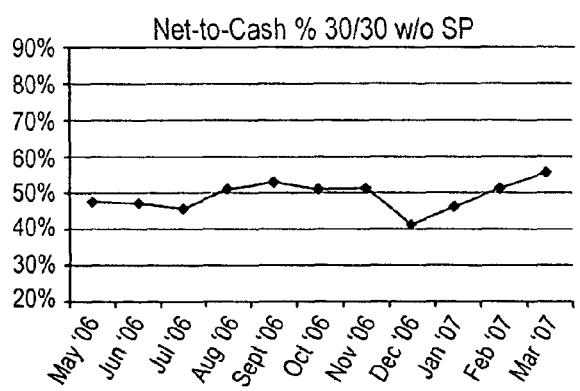

FIG. 5-2 includes a number of reports generated by general metrics engine 405 and GUI tools 420 for an overall organization, in accordance with an embodiment of the present invention. FIG. 5-2(a) is a chart of total cash received for accounts with insurance over the period from May 2006 to December 2007. FIG. 5-2(b) is a chart of charges that are 120 days old over the period from May 2006 to December 2006. FIG. 5-2(c) is the same chart as FIG. 5-1(a). FIG. 5-2(d) is a chart of payments received for insured accounts by day 90 divided by payments owed at day 90 over the period from May 2006 to January 2007. FIG. 5-2(e) is a chart of payments received for insured accounts by day 60 divided by payments owed at day 60 for the period from May 2006 to February 2007. FIG. 5-2(f) is a chart of payments received at day 30 divided by payments owed at day 30 for the period from May 2006 to March 2007.

Figures 3A, 5:
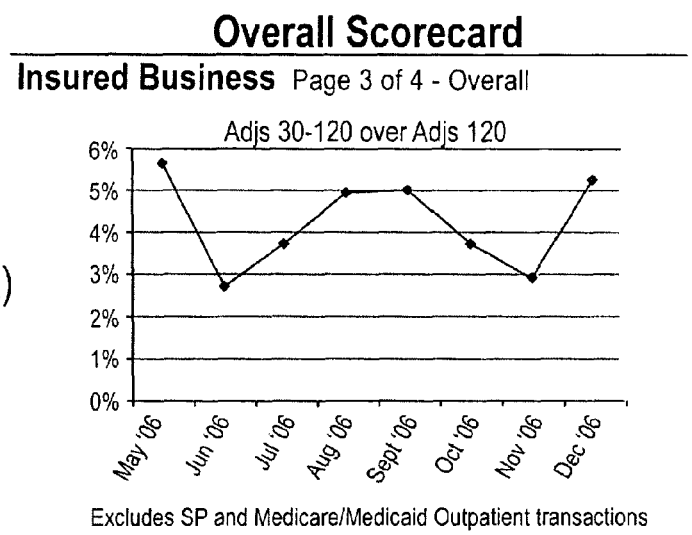
Figures 3B, 5:
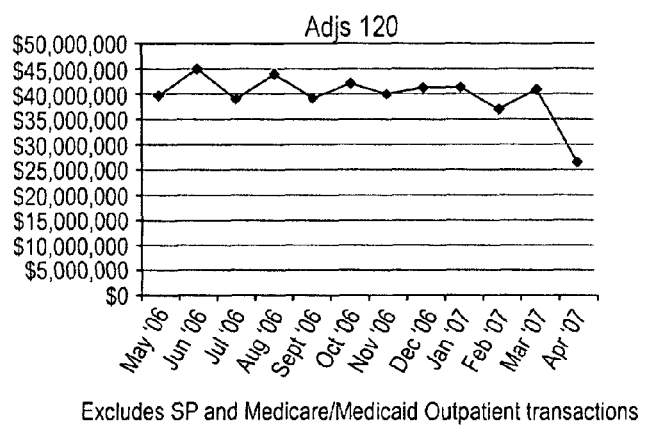

FIG. 5-3 includes a number of reports generated by general metrics engine 405 and GUI tools 420 for an overall organization, in accordance with an embodiment of the present invention. FIG. 5-3(a) is a chart of adjustment transactions between day 30 and day 120 divided by the total adjustments at day 120 over the period from May 2006 to December 2006. FIG. 5-3(b) is a chart of total adjustments at day 120 over the period from May 2006 to April 2007.

Figures 4A, 5:
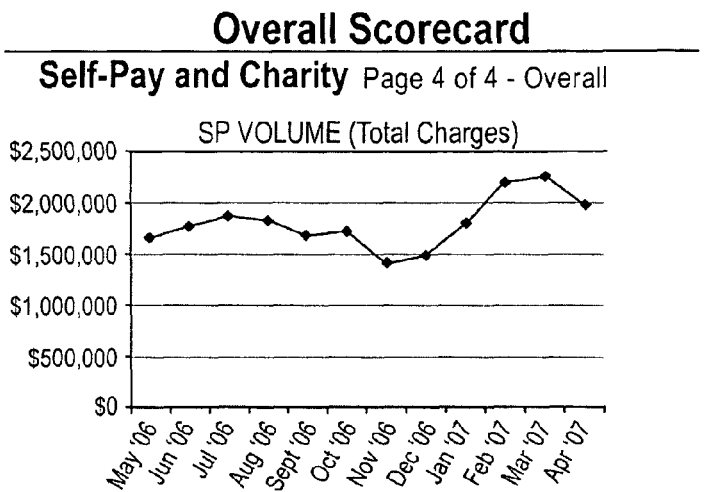
Figures 4B, 5:
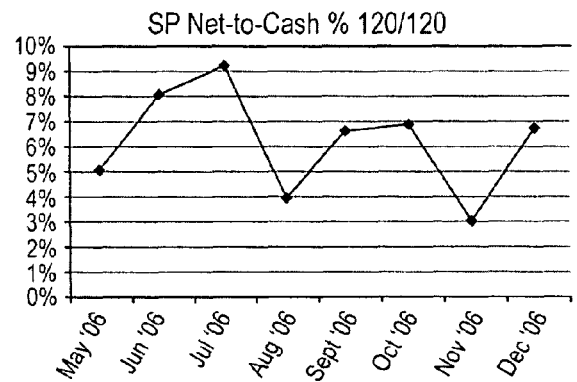
Figures 4C, 5:
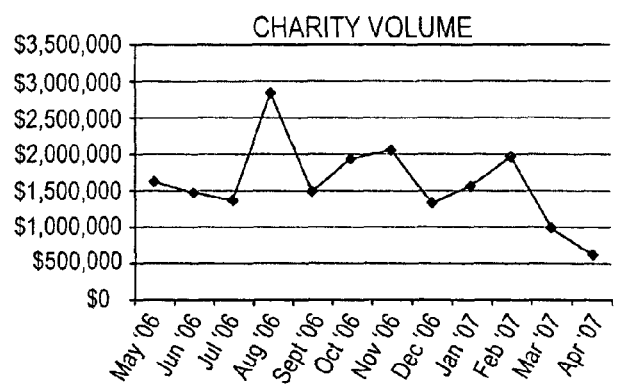
Figures 4D, 5:
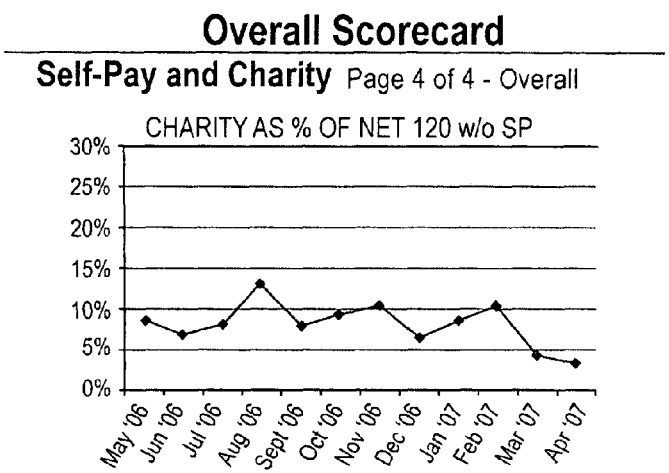
Figures 4E, 5:
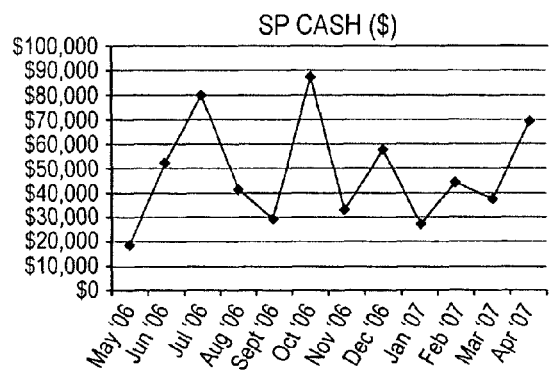
Figure 6A:
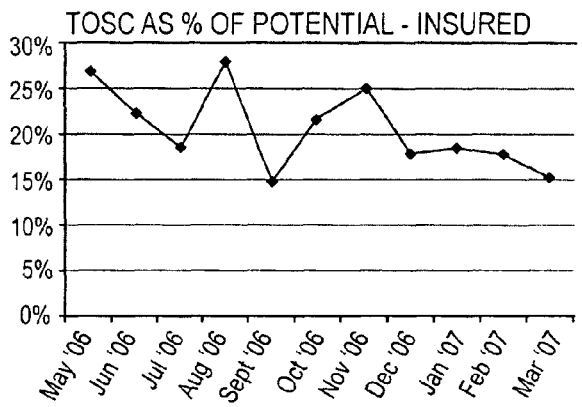
FIG. 6 includes graphs of a financial report of a single facility of an overall organization, in accordance with an embodiment of the present invention.
Figure 6B:
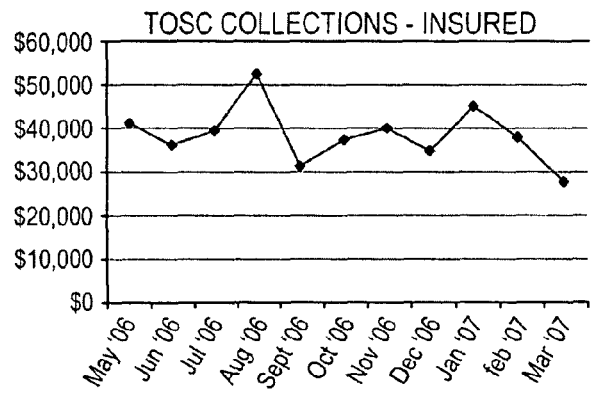
Figure 6C:
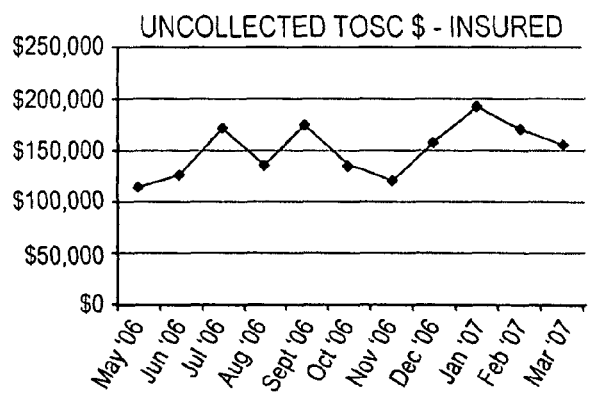
Figure 6D:
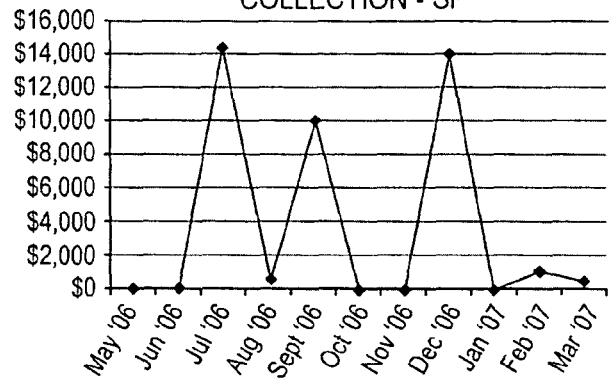
Figure 6E:
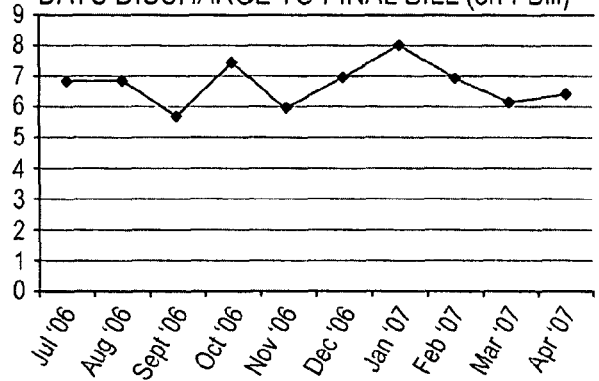
Figure 6F:
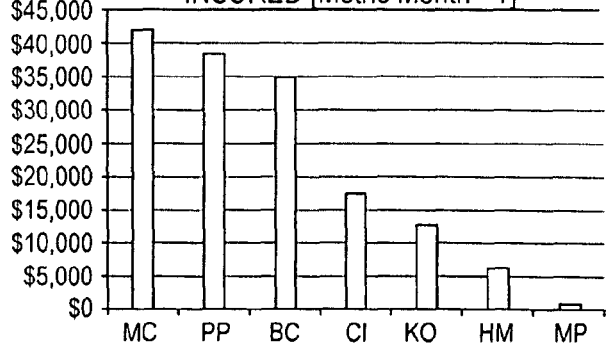

FIG. 5-4 includes a number of reports generated by general metrics engine 405 and GUI tools 420 for an overall organization, in accordance with an embodiment of the present invention. FIG. 5-4(a) is a chart of total payments made on accounts without insurance over the period from May 2006 to April 2007. FIG. 5-4(b) is a chart of payments made on accounts without insurance by day 120 divided by payments owed at day 120 over the period from May 2006 to December 2006. FIG. 5-4(c) is a chart of total charity (which may include adjustments made after a predetermined age) over the period from May 2006 to April 2007. FIG. 5-4(d) is a chart of the percent of payments on accounts with insurance that were written off to charity (which may include adjustments made after a predetermined age) over the period from May 2006 to April 2007. FIG. 5-4(e) is a chart of cash payments made on accounts without insurance over the period from May 2006 to April 2007.

FIG. 6 includes a number of reports generated by general metrics engine 405 and GUI tools 420 for a single admitting team in a facility of the overall organization, in accordance with an embodiment of the present invention. FIG. 6(a) is a chart that shows how GUI tools 420 represent the time of service report calculated by general metrics engine 405 and described in detail above. Data points created by general metrics engine 405 for this metric are represented graphically by GUI tools 420 over the period from May 2006 to March 2007. FIG. 6(b) is a chart of time of service collections on accounts with insurance admitted by the team over the period from May 2006 to March 2007. FIG. 6(c) is a chart of uncollected time of service collections on accounts with insurance admitted by the team over the period from May 2006 to March 2007. FIG. 6(d) is a chart of time of service collections for accounts without insurance admitted by team over the period from May 2006 to March 2007. FIG. 6(e) is a chart of days after discharge until the final bill is mailed for patients admitted by the team over the period from July 2006 to April 2007. FIG. 6(f) is a chart of uncollected time of service collections for accounts with insurance admitted by the team.

Figure 7:
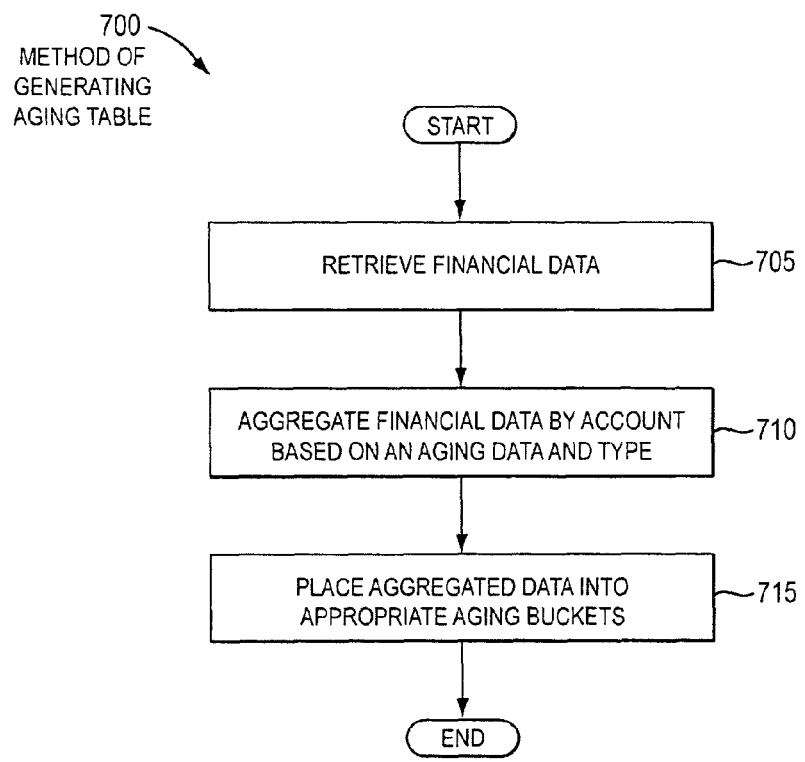
FIG. 7 is a flowchart illustrating a method of generating an aging table, in accordance with an embodiment of the present invention.

FIG. 7 is a flowchart illustrating a method 700 of generating an aging table 335, in accordance with an embodiment of the present invention. Method 700 begins with the age-based aggregation module 330 in step 705 retrieving financial data, e.g., transaction data and account data, from the transaction table 325 and account table 320. The age-based aggregation module 330 in step 710 aggregates the transaction data by account based on its age, transaction type, and/or account characteristics, such as date of discharge or date of final bill. The age-based aggregation module 330 in step 715 places the aged and aggregated data into appropriate aging buckets in the aging table 335. Method 700 then ends.

Figure 8:
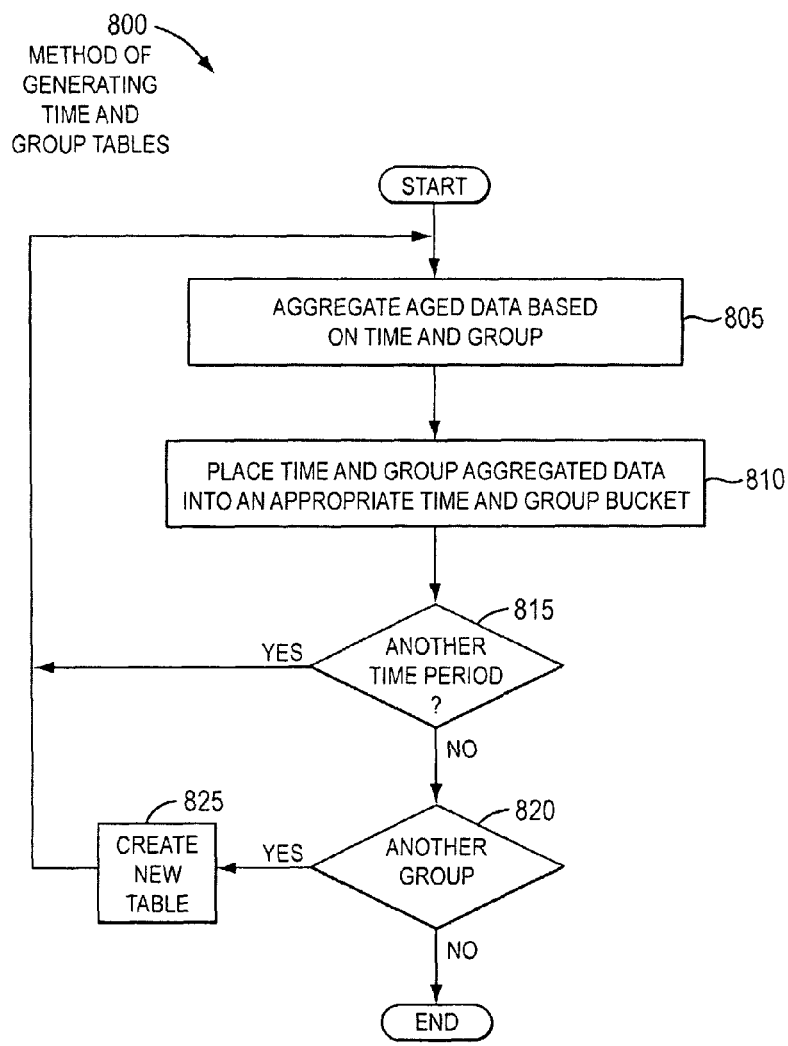
FIG. 8 is a flowchart illustrating a method of generating time and group tables, in accordance with an embodiment of the present invention.

FIG. 8 is a flowchart illustrating a method 800 of generating time and group tables 345, in accordance with an embodiment of the present invention. Method 800 begins with the time and group aggregation module 340 in step 805 aggregating aged data from the aging table 335 for a first group over a first time period. The time and group aggregation module 340 in step 810 places the time and group aged and aggregated data into a first time and group bucket in the first time and group table 345 pertaining to the first group. If the time and group aggregation module 340 in step 815 determines that another time period exists for aggregation for the first group, then the method 800 returns to step 805 to aggregate the aged data for the new time period for the first group, and then to step 810 to place the new aggregation of financial data into a new time and group bucket in the first time and group table 345. If the time and group aggregation module 340 in step 815 determines that no other time periods are to be aggregated for the first group, then the time and group aggregation module 340 in step 820 determines whether additional groups exist. If so, then the time and group aggregation module 340 creates a new time and group table 345, and the method 800 returns to step 805 to being aggregation and bucket generation for the new group. If not, then the method 800 ends.

Figure 9:
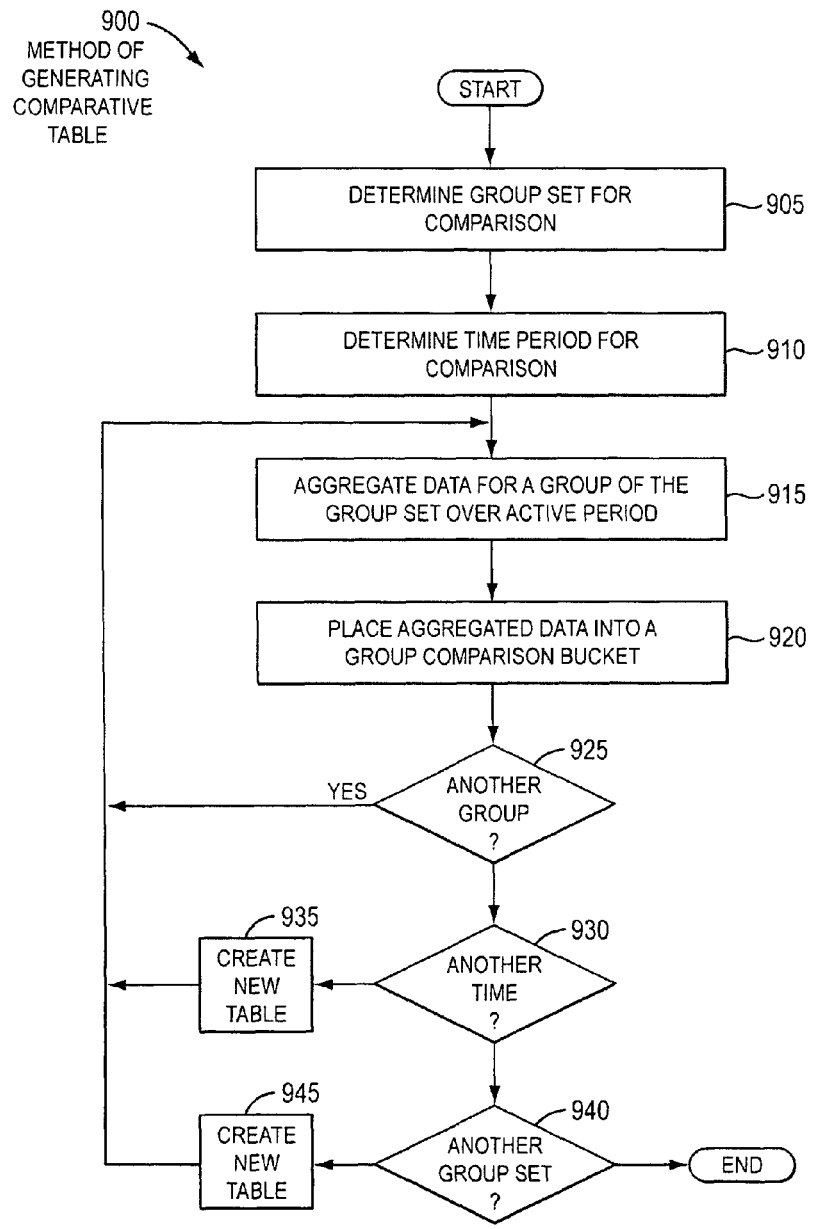
FIG. 9 is a flowchart illustrating a method of generating comparative tables, in accordance with an embodiment of the present invention.

FIG. 9 is a flowchart illustrating a method 900 of generating comparative grouping tables 355, in accordance with an embodiment of the present invention. Method 900 begins with the comparative groupings module 350 in step 905 determining a set of groups for comparison. The comparative groupings module 350 in step 910 determines a time period for comparison. The comparative groupings module 350 in step 915 aggregates data for a group of the group set over a time period, and in step 920 places the aggregated data into a time and group comparison bucket of a comparative grouping table 355. The comparative groupings module 350 in step 925 determines whether another group of the set of groups exists. If so, then the method 900 returns to step 915 to aggregate the data for this time period for the next group, and to step 920 to place the time and group aggregated data for the next group into another time and group bucket of the comparative grouping table 355. If in step 925 no more groups exist, then the comparative groupings module 350 in step 930 determines if there is another time period to review for the group set. If so, then the comparative groupings module 350 in step 935 creates a new comparative grouping table and the method 900 returns to step 915 to generate new time and group buckets. If in step 930 no more times exist, then the comparative groupings module 350 in step 940 determines if another set of groups exist for comparative groupings table generation. If so, then the comparative groupings module 350 in step 945 creates a new table, and the method 900 returns to step 915 generate new time and group buckets. Otherwise, the method 900 ends.

FIG. 10 illustrates an example aging table 335, in accordance with an embodiment of the present invention. As shown, aging table 335 includes a plurality of buckets 1005a-1005j. More specifically, aging table 335 includes an adjustment transaction bucket 1005a at 30 days of age (relative to an aging date), an adjustment transaction bucket 1005b at 60 days of age, and so on. Aging table 335 further includes a payment transaction bucket 1005c at 30 days of age, a payment transaction bucket 1005d at 60 days of age, and so on. Aging table 335 further includes a refund transaction bucket at 30 days of age, a refund transaction bucket at 60 days of age, and so on. Aging table 335 further includes a denial transaction bucket 1005g at 30 days of age, a denial transaction bucket 1005h at 60 days of age, and so on. Aging table 335 further includes an aging account bucket 1005i at 30 days of age, an aging account bucket 1005j at 60 days of age, and so on. Aging table 335 may further include additional buckets for additional transaction types, for additional ages, and for additional criteria that support the generation of precise metrics that accurately reflect operational performance.

FIG. 11 illustrates example time and group tables 345, in accordance with an embodiment of the present invention. In one embodiment, time and group aggregation module 340 generates a time and group table 345 for each group for which general metrics engine 405 and/or comparative accounting engine 415 will subsequently generate metrics. For instance, time and group tables 345 may include a first time and group table 1105a for teams of organization 1, and a second time and group table 1105b for teams of organization group 2. More specifically, the first time and group table 1105a includes a bucket 1110a for payment transactions for team 1 of organization 1 over the first fiscal quarter of 2006. The first time and group table 1105a also includes a bucket 1110c for payment transactions for team 1 of organization 1 over the second fiscal quarter of 2006. The first time and group table 1105a may include additional buckets for additional time periods, additional buckets for additional transaction types, etc. The second time and group table 1105b includes a bucket 1110b for payment transactions for team 2 of organization 1 over the first fiscal quarter of 2006. The second time and group table 1105b also includes a bucket 110d for payment transactions for team 2 of organization 1 over the second fiscal quarter of 2006. The second time and group table 110b may include additional buckets for additional time periods, additional buckets for additional transaction types, etc. The time and group tables 345 may include additional time and group tables 1105 for different groups (e.g., team 3, team 4, department 1, department 2, etc.) at different group levels (e.g., team, department, facility, etc.). Having a separate time and group table 345 for each group for which general metrics engine 405 and/or comparative accounting engine 415 will subsequently generate metrics facilitates generation of electronic reports by GUI Tools 420.

FIG. 12 illustrates example comparative groupings tables 355, in accordance with an embodiment of the present invention. In one embodiment, comparative groupings aggregation module 350 generates a comparative groupings table 355 for each group set for which comparative accounting engine 415 will subsequently generate metrics. For instance, comparative groupings tables 355 includes a first comparative groupings table 1205a for comparing teams within organization 1 over the first fiscal quarter of 2006, a second comparative groupings table 1205b for comparing teams in organization 1 over the second fiscal quarter of 2006, and so on. Comparative groupings tables 355 includes a third comparative grouping table 1205c for comparing organizations over the first fiscal quarter of 2006, a fourth comparative groupings table 1205d for comparing organizations over the second fiscal quarter of 2006, and so on. Comparative groupings tables 355 may further include additional comparative groupings tables 1205 for different group comparisons, different time period comparisons, etc. Having a separate comparative groupings table 355 for each group set for which comparative accounting engine 415 will subsequently generate metrics facilitates generation of electronic reports by GUI Tools 420.

Since in one embodiment performance metrics are calculated using the most granular data available (e.g., account details and financial transactions), the metrics are not subject to intra-organizational manipulation and interpretation. All data provided is effectively 'normalized' of the organization's calculation methodologies. All data will be at an operational level, not impacted by accounting decisions specific to the organization, facility, or other structural division.

It will be appreciated that the above system and methods have been described in the context of pre-generating the various aggregations. Other embodiments may be implemented that can generate these aggregations on the fly. Thus, in response to a user request, a comparative grouping table 355 may be generated on the fly from the account table 320 and transaction table 325, not from a pre-generated aging table 335 and time and group tables 345 as an intermediate step. The comparative data may be generated by aging and aggregating the data upon request.

It is understood that different computer platforms aggregate data differently. For instance, given the volumes of financial data employed, storing data aggregated at the account level based on dates is often valuable, as it facilitates aggregation levels above the account level in a hierarchy. However, in an embodiment that employs Microsoft SQL Server Analysis Services, cube technology aggregates data in a manner which may facilitate report generation without first storing data aggregated at the account level, or storing data aggregated at higher levels. MS SQL Server 2005 Analysis Services cubes handle aggregation so quickly that intermediary aggregation tables, such as the aging, time & group, and comparative group tables, need not be pre-generated. In this embodiment, tables 125 may represent a Microsoft SQL Server data warehouse. Aggregation manager 305, data extraction module 310 and data normalization/storage module 315 may represent Microsoft SQL Server components, including Analysis Services. Aging table 335, time and group tables 345 and comparative groupings tables 355 together with aged-based aggregation module 330, time and group aggregation module 350 and comparative groupings aggregation module 350 may represent a Microsoft SQL Server Analysis Services cube. These components include facts and measures that define how the financial/account data is aggregated. MDX queries are employed to retrieve the aggregated data from the cube and/or data warehouse, as described in the operation of the accounting engines in FIG. 4.

Further, in this alternative embodiment, method 700 of FIG. 7 defines facts and measures that support the aging of transaction data by dates that include date of transaction as well as dates based on an account characteristic, such as date of discharge and date of final bill. Methods 700 and 800 define facts and measures to support aggregating aging data by groups that include account, team, department, facility, region, and organization.

The foregoing description of the preferred embodiments of the present invention is by way of example only, and other variations and modifications of the above-described embodiments and methods are possible in light of the foregoing teaching. For example, although the embodiments above have been described as using table-based data structures, one skilled in the art will recognize that other data structures may be used. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A computer system comprising:
a processor;
at least one system interface operative to retrieve financial data of an organization according to a first schedule from at least one financial information management system, the financial data including transaction records for a plurality of accounts of the organization, each transaction record of the plurality of accounts associated with a corresponding invoice and a corresponding aging date, each corresponding invoice specifying an amount due, the transaction records identifying payments, adjustments and refunds;
a data aggregation system operative to calculate for each of the invoices and transaction records of the plurality of accounts an age of the corresponding amount due relative to the corresponding aging date associated with the transaction record, an age of any corresponding payment relative to the corresponding aging date associated with the transaction record, an age of any corresponding adjustment relative to the corresponding aging date associated with the transaction record, and an age of any corresponding refund relative to the corresponding aging date associated with the transaction record, and according to predetermined rules to aggregate the invoices into corresponding invoice buckets based on the age of each invoice, the transaction records of the payments into corresponding payment buckets based on the age of each payment, the transaction records of the adjustments into corresponding adjustment buckets based on the age of each adjustment, and the transaction records of the refunds transaction records into corresponding refund buckets based on the age of each refund, the data aggregation system operative to aggregate the invoices and transaction records of the amounts due, payments, adjustments, and refunds according to a second schedule so that the invoice buckets, payment buckets, adjustment buckets and refund buckets remain substantially current and independent of whether a report generation request has been received; and a report generation system operative to receive the report generation request after the data aggregation system aggregates the invoices and transaction records of the amounts due, payments, adjustments, and refunds into the corresponding invoice buckets, payment buckets, adjustment buckets, and refund buckets, and to generate a financial report in response to receipt of the report generation request, the financial report being based on the invoices and the transaction records of the amounts due, payments, adjustments, and refunds as aggregated in the corresponding invoice buckets, payment buckets, adjustment buckets, and refund buckets, the financial report for assisting in evaluating a financial state of the organization.

2. The system of claim 1, wherein the at least one financial information management system stores the financial data for multiple entities of the organization.

3. The system of claim 1, wherein the data aggregation system includes a data normalization module operative to normalize the financial data to a common standard.

4. The system of claim 1, wherein the aging date is based on at least one of date of discharge or date of final invoice.

5. The system of claim 1, wherein the predetermined rules include a first function based on transaction type and age.

6. The system of claim 5, wherein the predetermined rules include a second function based on group, and the data aggregation module generates aggregated and grouped transaction records.

7. The system of claim 6, wherein the data aggregation module stores respective portions of the aggregated and grouped transaction records belonging to particular combinations of transaction type, age and group in a second set of buckets.

8. The system of claim 7, wherein the predetermined rules include a third function based on a group set, and the data aggregation module is operative to store particular combinations of aggregated and grouped transaction records for the group set in a third set of buckets.

9. The system of claim 1, wherein the aging date comprises one or more of: a date of discharge, a shipment date, and an invoice date.

10. The system of claim 1, wherein the first schedule is the same as the second schedule.

11. A processor-controlled method performed by a computer system having at least one processor, the method comprising:

retrieving, using the at least one processor of the computer system, financial data of an organization according to a first schedule from at least one financial information management system, the financial data including transaction records for a plurality of accounts of the organization, each transaction record of the plurality of accounts associated with a corresponding invoice and a corresponding aging date, each corresponding invoice specifying an amount due, the transaction records identifying payments, adjustments and refunds;

calculating, using the at least one processor of the computer system, for each of the invoices and transaction records of the plurality of accounts an age of the corresponding amount due relative to the corresponding aging date associated with the transaction record, an age of any corresponding payment relative to the corresponding aging date associated with the transaction record, an age of any corresponding adjustment relative to the corresponding aging date associated with the transaction record, and an age of any corresponding refund relative to the corresponding aging date associated with the transaction record;

aggregating, using the at least one processor of the computer system, according to predetermined rules, invoices into corresponding invoice buckets based on the age of each invoice, the transaction records of the payments into corresponding payment buckets based on the age of each payment, the transaction records of the adjustments into corresponding adjustment buckets based on the age of each adjustment, and the transaction records of the refunds into corresponding refund buckets based on the age of each refund, the aggregating of the invoices and transaction records of the amounts due, payments, adjustments and refunds occurring according to a second schedule so that the invoice buckets, payment buckets, adjustment buckets and refund buckets remain substantially current and independent of whether a report generation request has been received;

receiving, using the at least one processor of the computer system, the report generation request after the invoices and transactions records of the amounts due, payments, adjustments, and refunds are aggregated into the corresponding invoice buckets, payment buckets, adjustment buckets, and refund buckets; and generating, using the at least one processor of the computer system, a financial report in response to the receipt of the report generation request, the financial report being based on the invoices and the transaction records of the amounts due, payments, adjustments and refunds as aggregated in the corresponding invoice buckets, payment buckets, adjustment buckets, and refund buckets, the financial report for assisting in evaluating a financial state of the organization.

12. The method of claim 11, wherein the at least one financial information management system stores the financial data for at least one organization.

13. The method of claim 11, further comprising normalizing the financial data to a common standard.

14. The method of claim 11, wherein the aging date is based on at least one of date of discharge or date of final invoice.

15. The method of claim 11, wherein the predetermined rules include a first function based on transaction type and age.

16. The method of claim 15, wherein the predetermined rules include a second function based on group, and further comprising generating aggregated and grouped transaction records.

17. The method of claim 16, further comprising storing respective portions of the aggregated and grouped transaction records belonging to particular combinations of transaction type, age and group in a second set of buckets.

18. The method of claim 17, wherein the predetermined rules include a third function based on a group set, and further comprising storing particular combinations of aggregated and grouped transaction records for the group set in a third set of buckets.

19. The method of claim 11, wherein the aging date comprises one or more of: a date of discharge, a shipment date, and an invoice date.

20. The method of claim 11, wherein the first schedule is the same as the second schedule.

* * * * *

UNITED STATES PATENT AND TRADEMARK OFFICE
CERTIFICATE OF CORRECTION

PATENT NO.         : 8,825,537 B2                                    Page 1 of 1
APPLICATION NO.    : 12/039642
DATED              : September 2, 2014
INVENTOR(S)        : Mischa Dick et al.

It is certified that error appears in the above-identified patent and that said Letters Patent is hereby corrected as shown below:

In the Claims

Claim 1, column 16, line 16:
"records of the refunds transaction records into corresponding"

should read
-- records of the refunds into corresponding --

Signed and Sealed this
Ninth Day of June, 2015

Michelle K. Lee
*Director of the United States Patent and Trademark Office*